(12) United States Patent
Shin et al.

(10) Patent No.: US 9,219,798 B2
(45) Date of Patent: Dec. 22, 2015

(54) CLIENT AND SERVER TERMINALS AND METHOD FOR CONTROLLING THE SAME

(75) Inventors: Woohyoung Shin, Seoul (KR); Sungho Woo, Seoul (KR); Kyunglang Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 443 days.

(21) Appl. No.: 13/466,535

(22) Filed: May 8, 2012

(65) Prior Publication Data

US 2012/0331042 A1 Dec. 27, 2012

(30) Foreign Application Priority Data

Jun. 21, 2011 (KR) .................... 10-2011-0060070

(51) Int. Cl.
| | |
|---|---|
| G06F 15/16 | (2006.01) |
| H04L 29/06 | (2006.01) |
| G06F 17/30 | (2006.01) |
| H04W 4/02 | (2009.01) |

(52) U.S. Cl.
CPC .......... *H04L 67/42* (2013.01); *G06F 17/30082* (2013.01); *G06F 17/30174* (2013.01); *H04W 4/02* (2013.01)

(58) Field of Classification Search
CPC .. H04L 29/08081–29/08108; H04L 29/08117;
G06F 17/30067–17/3007; G06F 17/30144;
G06F 17/30082; G06F 17/30165–17/30174;
G06F 17/30575
USPC .......... 709/203–205, 217–219, 225; 707/609–611
See application file for complete search history.

(56) References Cited

U.S. PATENT DOCUMENTS

| | | | | |
|---|---|---|---|---|
| 6,813,618 | B1* | 11/2004 | Loui et al. .................... | 1/1 |
| 7,587,675 | B2* | 9/2009 | Cunningham et al. ........ | 715/734 |
| 7,668,880 | B1* | 2/2010 | Carroll ........................ | 707/640 |
| 7,747,684 | B2* | 6/2010 | Karube et al. ............... | 709/204 |
| 8,121,990 | B1* | 2/2012 | Chapweske et al. .......... | 707/695 |
| 8,156,146 | B2* | 4/2012 | Arthursson ................... | 707/783 |
| 8,566,700 | B2* | 10/2013 | Ueda ............................ | 715/232 |
| 8,656,290 | B1* | 2/2014 | Greenspan et al. ........... | 715/753 |
| 8,732,182 | B2* | 5/2014 | Bethlehem et al. .......... | 707/758 |
| 2001/0016878 | A1* | 8/2001 | Yamanaka .................... | 709/234 |
| 2001/0020243 | A1* | 9/2001 | Koppolu et al. ............. | 707/513 |
| 2002/0029242 | A1* | 3/2002 | Seto ............................. | 709/203 |
| 2002/0055946 | A1* | 5/2002 | Prager et al. ................ | 707/500 |
| 2002/0083178 | A1* | 6/2002 | Brothers ....................... | 709/226 |

(Continued)

FOREIGN PATENT DOCUMENTS

| | | |
|---|---|---|
| EP | 1701483 A1 | 9/2006 |
| WO | WO 2007/076135 A2 | 7/2007 |

OTHER PUBLICATIONS

"Upload" Newton's Telecom Dictionary, 21st ed., Mar. 2005.*

(Continued)

*Primary Examiner* — Brendan Higa
(74) *Attorney, Agent, or Firm* — Birch, Stewart, Kolasch & Birch, LLP

(57) ABSTRACT

Client and server terminals and method for controlling the same are disclosed, by which a use of a terminal is facilitated in further consideration of user's convenience. According to at least one of embodiments of the present invention, a specific folder (or all folders) storing files of the server terminal can be recognized as a folder in the corresponding client terminal to facilitate the files of the server terminal to be used by a user of the client terminal more conveniently.

21 Claims, 15 Drawing Sheets

(56) References Cited

U.S. PATENT DOCUMENTS

| | | | |
|---|---|---|---|
| 2002/0112020 A1* | 8/2002 | Fisher | 709/215 |
| 2003/0145093 A1* | 7/2003 | Oren et al. | 709/229 |
| 2003/0158927 A1* | 8/2003 | Sagey et al. | 709/223 |
| 2003/0164856 A1* | 9/2003 | Prager et al. | 345/764 |
| 2003/0172269 A1* | 9/2003 | Newcombe | 713/168 |
| 2004/0070632 A1* | 4/2004 | Wilkes | 345/850 |
| 2005/0149481 A1 | 7/2005 | Hesselink et al. | |
| 2005/0219665 A1* | 10/2005 | Mino | 358/537 |
| 2005/0237567 A1* | 10/2005 | Morris | 358/1.15 |
| 2005/0270062 A1* | 12/2005 | Cornett | 326/39 |
| 2006/0143292 A1* | 6/2006 | Taubenheim et al. | 709/225 |
| 2007/0204231 A1* | 8/2007 | Cunningham et al. | 715/734 |
| 2008/0091768 A1* | 4/2008 | Tanimoto | 709/202 |
| 2008/0247368 A1* | 10/2008 | Uppala et al. | 370/338 |
| 2008/0307106 A1* | 12/2008 | Miller et al. | 709/231 |
| 2010/0058353 A1* | 3/2010 | Turski | 719/311 |
| 2011/0163971 A1* | 7/2011 | Wagner et al. | 345/173 |
| 2013/0055359 A1* | 2/2013 | Sasaki | 726/4 |

OTHER PUBLICATIONS

"Network File System" Newton's Telecom Dictionary, 21st ed., Mar. 2005.*

* cited by examiner (6-1)

(6-2)

(7-1)

(7-2)

(7-3)

(7-4)

(7-5)

(9-1)

(9-2)

(11-1)

(11-2)

(15-1)

(15-2)

CLIENT AND SERVER TERMINALS AND METHOD FOR CONTROLLING THE SAME

Pursuant to 35 U.S.C. §119(a), this application claims the benefit of earlier filing date and right of priority to Korean Application No. 10-2011-0060070, filed on Jun. 21, 2011, the contents of which are hereby incorporated by reference herein in their entirety.

BACKGROUND OF THE INVENTION

1. Field of the Invention

The present invention relates to client and server terminals and method for controlling the same. Although the present invention is suitable for a wide scope of applications, it is particularly suitable for facilitating a use of a terminal in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, the necessity for file sharing between terminals is frequently rising. For instance, a user simultaneously holds at least two or more terminals (e.g., smart phone, tablet PC, etc.) and may frequently transfer files (e.g., multimedia contents of photo files, music files, etc.) saved in the at least two terminals to each other. When at least two users hold their terminals, respectively, it may frequently occur that a file saved in one terminal is shared with another terminal. In this case, a terminal providing a file may be understood as a server terminal or device and a terminal provided with a file may be understood as a client terminal or device.

There is one ongoing necessity for the client terminal to enable a specific folder (or all folders), which stores files of the server terminal, to be recognized as a folder in the corresponding client terminal, thereby facilitating the files of the server terminal to be used by a user of the client terminal more conveniently. That is, It might be convenient to a user of the client if the client can access the specific folder of the server terminal which stores files as if the specific folder were to be regarded by the client as being one of its own folders the client has therein.

While the server terminal meets the necessity for sharing files with the client terminal conveniently, there is another ongoing necessity for respecting privacy of a user of the server terminal in a manner of allowing files to be shared with a specific client terminal granted by the user of the server terminal only.

SUMMARY OF THE INVENTION

Accordingly, the present invention is directed to client and server terminals and method for controlling the same that substantially obviate one or more problems due to limitations and disadvantages of the related art.

An object of the present invention is to provide client and server terminals and method for controlling the same, by which a specific folder (or all folders) storing files of the server terminal can be recognized as a folder in the corresponding client terminal to facilitate the files of the server terminal to be used by a user of the client terminal more conveniently.

Another object of the present invention is to provide client and server terminals and method for controlling the same, by which privacy of a user of the server terminal can be respected in a manner of allowing files to be shared with a specific client terminal granted by the server terminal only.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a client device according to the present invention may include a display unit, a communication unit configured to communicate with a server device having a server memory including at least one server folder, and a controller configured to, if a communication with the server device is established and a specific sever folder of the server memory is accessed according to a file sharing system scheme, automatically scan the specific server folder, and if an application related to at least one file within the scanned specific server folder is executed, automatically upload at least one indicator of the at least one file to the application.

In another aspect of the present invention, a server device according to the present invention may include a memory including at least one folder, a communication unit configured to communicate with a client device, a controller configured to, if the communication unit establishes the communication with the client device, receive and save a prescribed identifier from the client device, receive an access request signal for an access to a specific folder of the memory from the client device in a manner that the access request signal contains an identifier identical to the transmitted prescribed identifier, and if the saved identifier is equal to the identifier contained in the access request signal, control the specific folder to be accessed by a file sharing system scheme by transmitting a grant signal for the access request signal to the client device.

In another aspect of the present invention, a method of controlling a client device according to the present invention may include communicating with a server device having a server memory including at least one server folder, if a communication with the server device is established and a specific sever folder of the server memory is accessed according to a file sharing system scheme, automatically scanning the specific server folder, and if an application related to at least one file within the scanned specific server folder is executed, automatically uploading at least one indicator of the at least one file to the application.

In another aspect of the present invention, an electronic recording medium according to the present invention may be encoded to enable a client device to execute a command for communicating with a server device having a server memory including at least one server folder, a command for, if a communication with the server device is established and a specific sever folder of the server memory is accessed according to a file sharing system scheme, automatically scanning the specific server folder, and a command for, if an application related to at least one file within the scanned specific server folder is executed, automatically uploading at least one indicator of the at least one file to the application.

In another aspect of the present invention, a method of controlling a server device according to the present invention may include attempting a communicate with a client device, if the communication with the client device is established, receiving and saving a prescribed identifier from the client device, receiving an access request signal for an access to a specific folder of the memory from the client device in a manner that the access request signal contains an identifier identical to the transmitted prescribed identifier, and if the saved identifier is equal to the identifier contained in the access request signal, controlling the specific folder to be accessed by a file sharing system scheme by transmitting a grant signal for the access request signal to the client device.

In a further aspect of the present invention, an electronic recording medium according to the present invention may be encoded to enable a server device to execute a command for attempting a communicate with a client device, a command for, if the communication with the client device is established, receiving and saving a prescribed identifier from the client device, a command for receiving an access request signal for an access to a specific folder of the memory from the client device in a manner that the access request signal contains an identifier identical to the transmitted prescribed identifier, and a command for, if the saved identifier is equal to the identifier contained in the access request signal, controlling the specific folder to be accessed by a file sharing system scheme by transmitting a grant signal for the access request signal to the client device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Components of the mobile terminal described in the following description except some components (e.g., position-location module, etc.) exclusively applied to a mobile terminal may be applicable to such a stationary terminal as a digital TV, a desktop computer and the like. Hence, it may be apparent to those skilled in the art, to which the present invention pertains, that the stationary terminal is usable as the client or server device.

Figure 1:
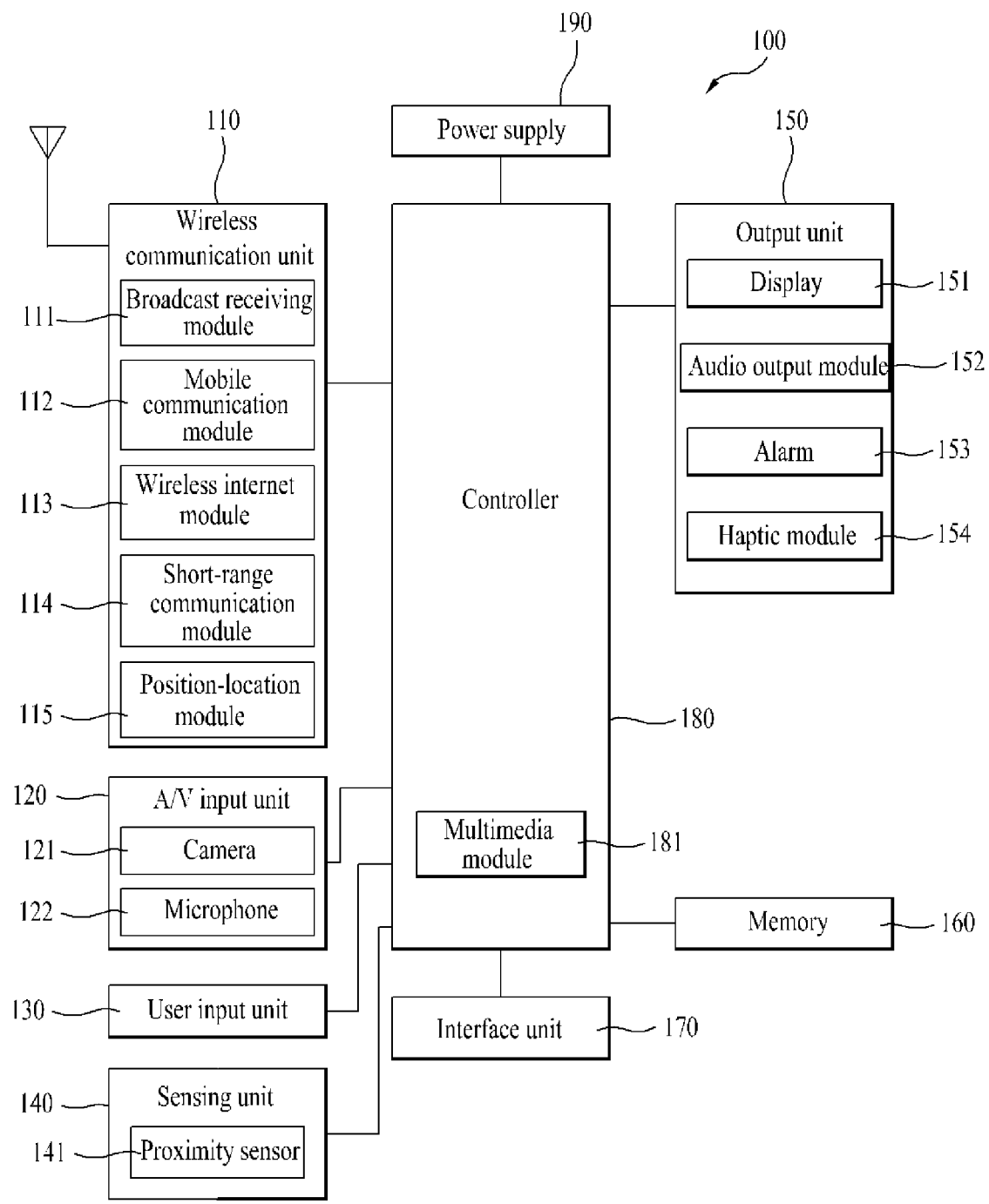
FIG. 1 is a block diagram of a client terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. The broadcast associated information can be provided via a mobile communication network. In this case, the broadcast associated information can be received by the mobile communication module 112.

The mobile communication module 112 transmits/receives wireless signals to/from one or more network entities (e.g., base station, external terminal, server, etc.) via a mobile communication network such as (but not limited to) GSM (Global System for Mobile communications), CDMA (Code Division Multiple Access), and WCDMA (Wideband CDMA). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include (but not limited to) WLAN (Wireless LAN) (Wi-Fi), Wibro (Wireless broadband), Wimax (World Interoperability for Microwave Access), HSDPA (High Speed Downlink Packet Access) GSM, CDMA, WCDMA, LTE (Long Term Evolution), etc.

The wireless internet module by WiFi may be named WiFi module. This WiFi module may be able to perform a soft access point (hereinafter abbreviated AP) function of providing WiFi services to neighbor terminals. In particular, if the soft AP function is activated in the mobile terminal, such an external device as a notebook may access the mobile terminal through the soft AP function.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. For instance, the sensing unit 140 may include at least one of a gyroscope sensor, an acceleration sensor, a geomagnetic sensor and the like. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

Considering that the wireless internet module 113 or the short-range communication module 114 is usable as the wireless data port, they may be understood as a sort of the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, the mobile terminal usable as the client device of the present invention has been explained. In the following description, a server device usable as a counterpart of the client device shall be explained.

No limitation is put on a type of a server device described in this specification if the server device is capable of communicating with the client device and providing data to the client device. For example, the server device may include one of a notebook computer (i.e., laptop computer), a tablet computer, a desktop computer and the like, by which the server device is non-limited. Moreover, the server device may include the mobile terminal described with reference to FIG. 1.

Figure 2:
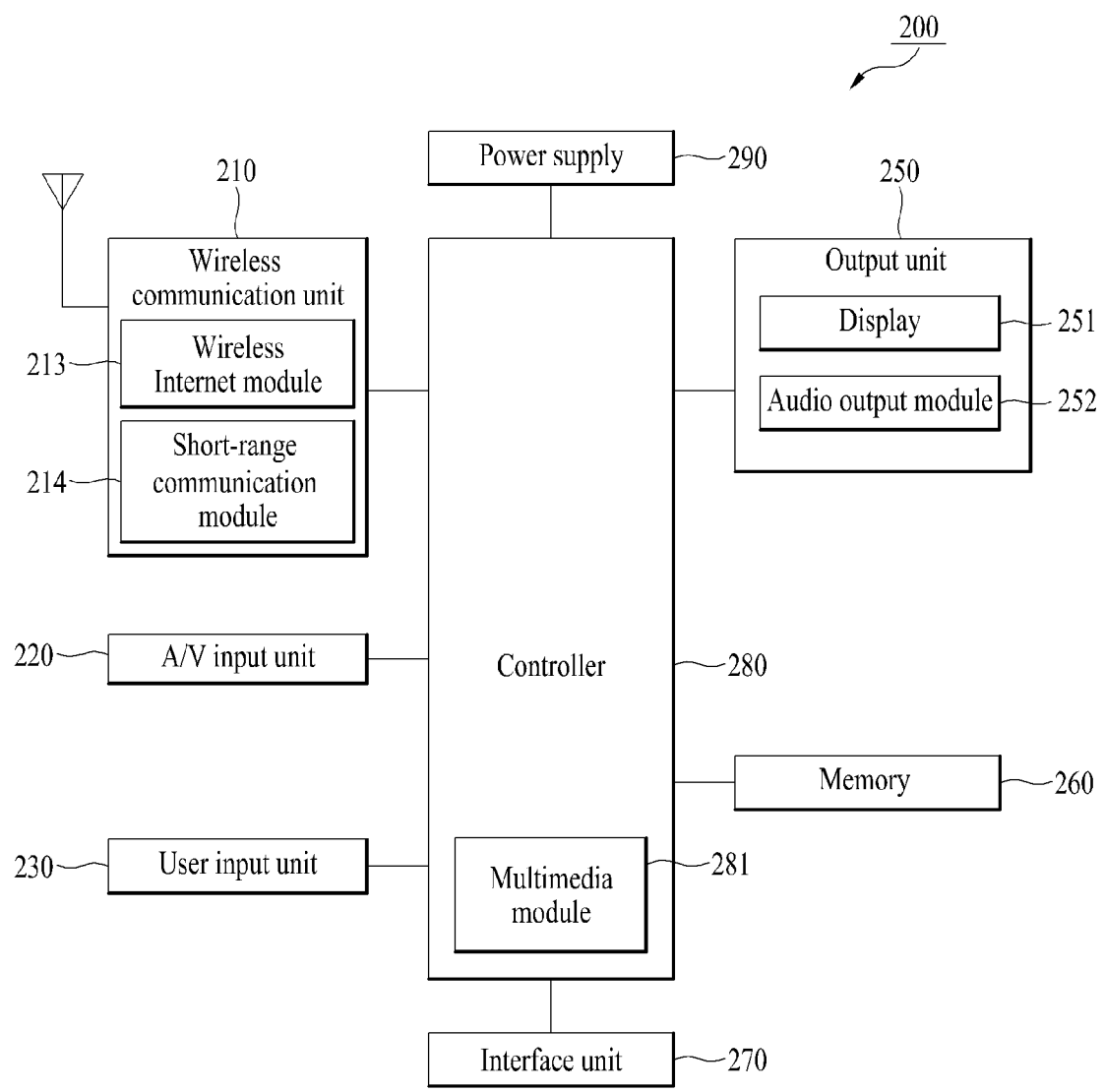
FIG. 2 is a block diagram of a server terminal according to one embodiment of the present invention.

FIG. 2 is a block diagram of a server terminal according to one embodiment of the present invention.

Referring to FIG. 2, a server device 200 may include a wireless communication unit 210, an A/V (audio/video) input unit 220, a user input unit 230, an output unit 250, a memory 260, an interface unit 270, a controller 280, a power supply 290 and the like.

The wireless communication unit 210 may include a wireless internet module 213 and a short-range communication module 214. The output unit 250 may include a display 251 and an audio output module 252.

The memory 260 may include at least one folder and files may be saved in the memory 260 by being categorized per folder.

The components of the server device 200 may be identical or considerably similar to the corresponding components of the mobile terminal 100 described with reference to FIG. 1, respectively. Hence, details of the components of the server device 200 shall be omitted for clarity of this specification.

Since all of the components shown in FIG. 2 may not be always necessary, the server device may be implemented with components more or less than the components shown in FIG. 2 if necessary.

In the following description, a communication network for implementing one embodiment of the present invention shall be schematically explained with reference to FIG. 3.

Figure 3:
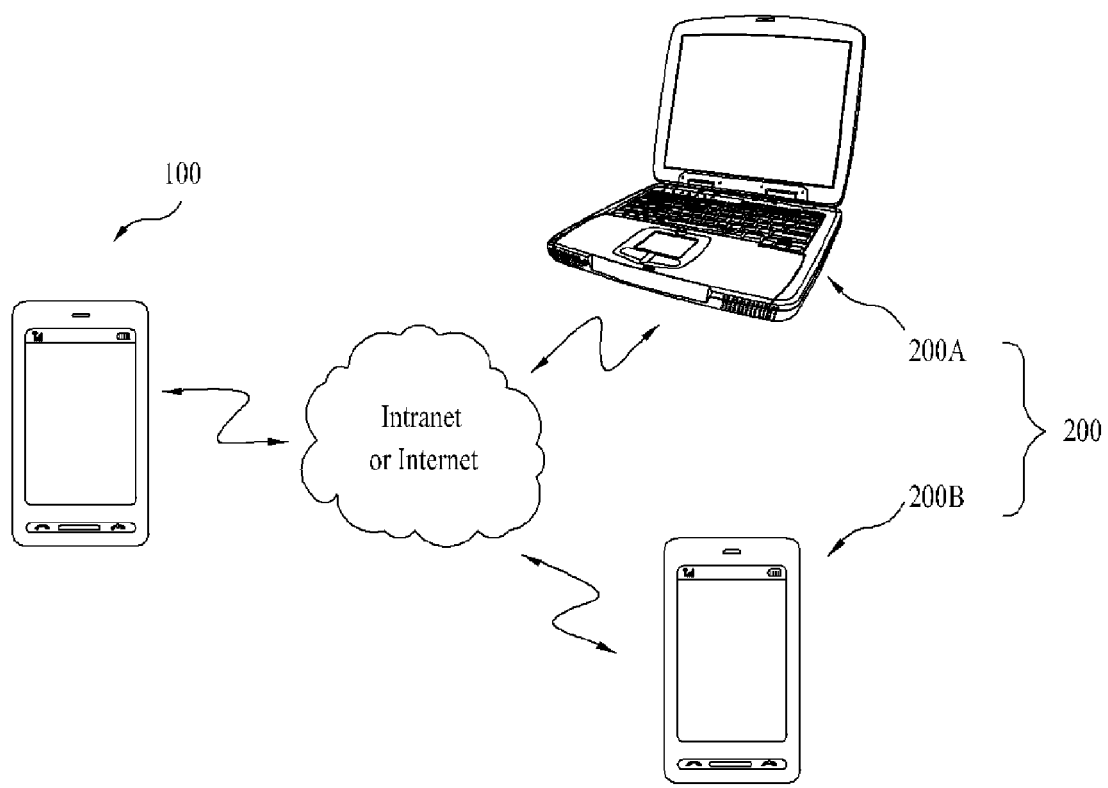
FIG. 3 is a diagram for a schematic configuration of a communication network to implement one embodiment of the present invention.

FIG. 3 is a diagram for a schematic configuration of a communication network to implement one embodiment of the present invention.

Referring to FIG. 3, a client device 100 may be connected with at least one server device 200 via intranet or internet communication. In particular, the client device 200 is communicating with two servers 200A and 200B, as exemplarily shown in FIG. 3. The intranet/internet communication may be performed by TCP/IP (Transmission Control Protocol/Internet Protocol) or UDP/IP (User Datagram Protocol/Internet Protocol).

In this specification, the intranet and the internet may be defined as follows. First of all, when a broadcast signal is transmitted from one device, a network range for another device to receive the transmitted broadcast signal shall be defined as an intranet. And, a network range including at least two or more intranets shall be defined as an internet.

Regarding details of the intranet, a network between at least two devices connected in common to one radio AP may become the intranet. And, a network between one device having a soft AP function activated and another device through the activated soft AP function may become the intranet communication.

In the following description, a case of a communication between the client device and the server device via the intranet and a case of a communication between the client device and the server device via the internet are separately explained.

The following description shall be explained on the assumption that the display module 151 of the client device 100 and the display module 251 of the server device 200 include touchscreens, respectively. And, it is apparent to those skilled in the art that the display modules 151 and 251 are non-limited by the touchscreens. In the following description, a display screen of the client device 100 may be indicated by a reference number 400, while a display screen of the server device 200 may be indicated by a reference number 500.

Explained in the following description with reference to FIGS. 4 to 7 is a case that the client device and the server device communicate with each other via the intranet.

Figure 4:
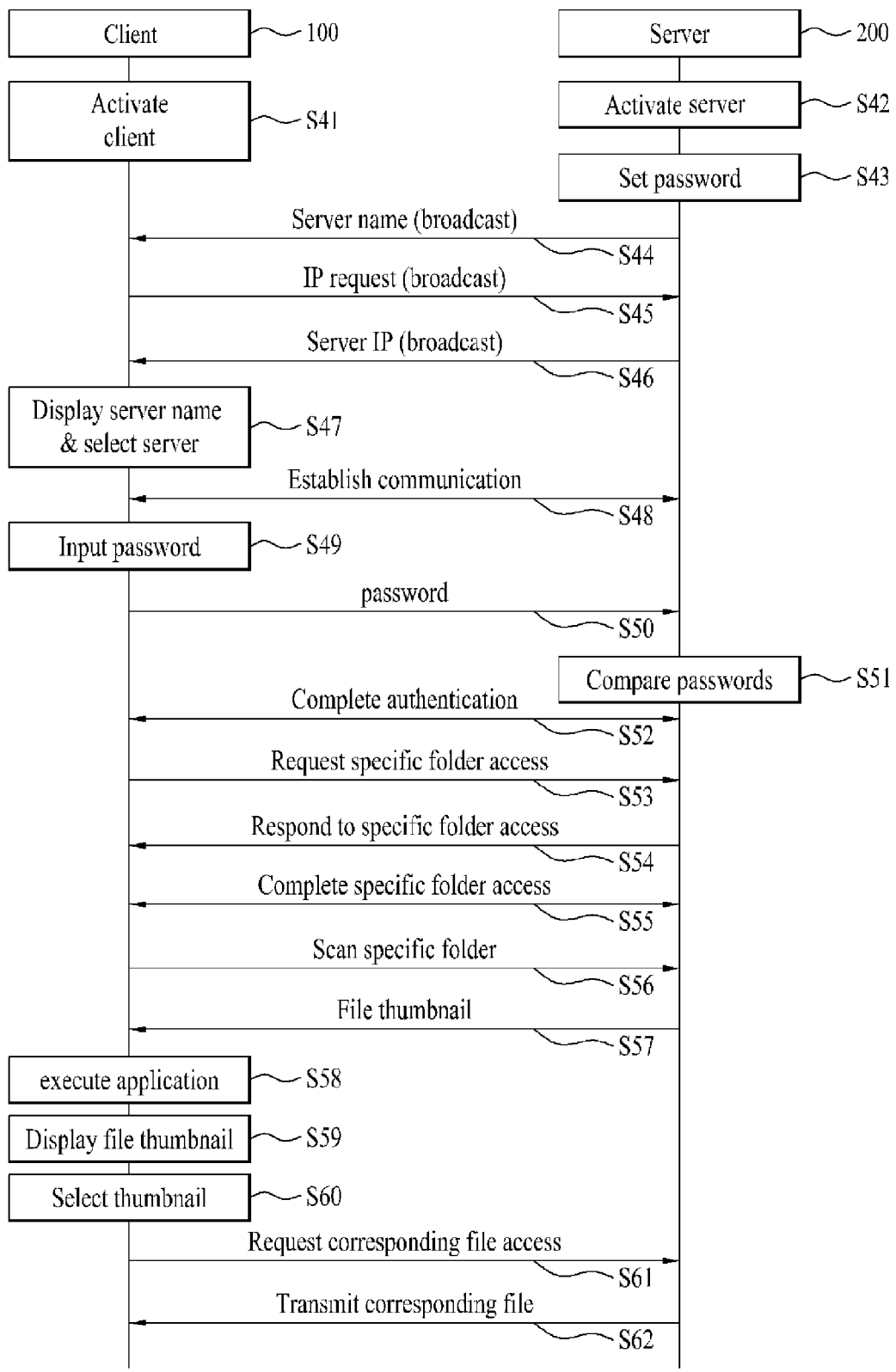
FIG. 4 is a flowchart for a communication between a client device and a server device via intranet according to an embodiment of the present invention.
Figure 5:
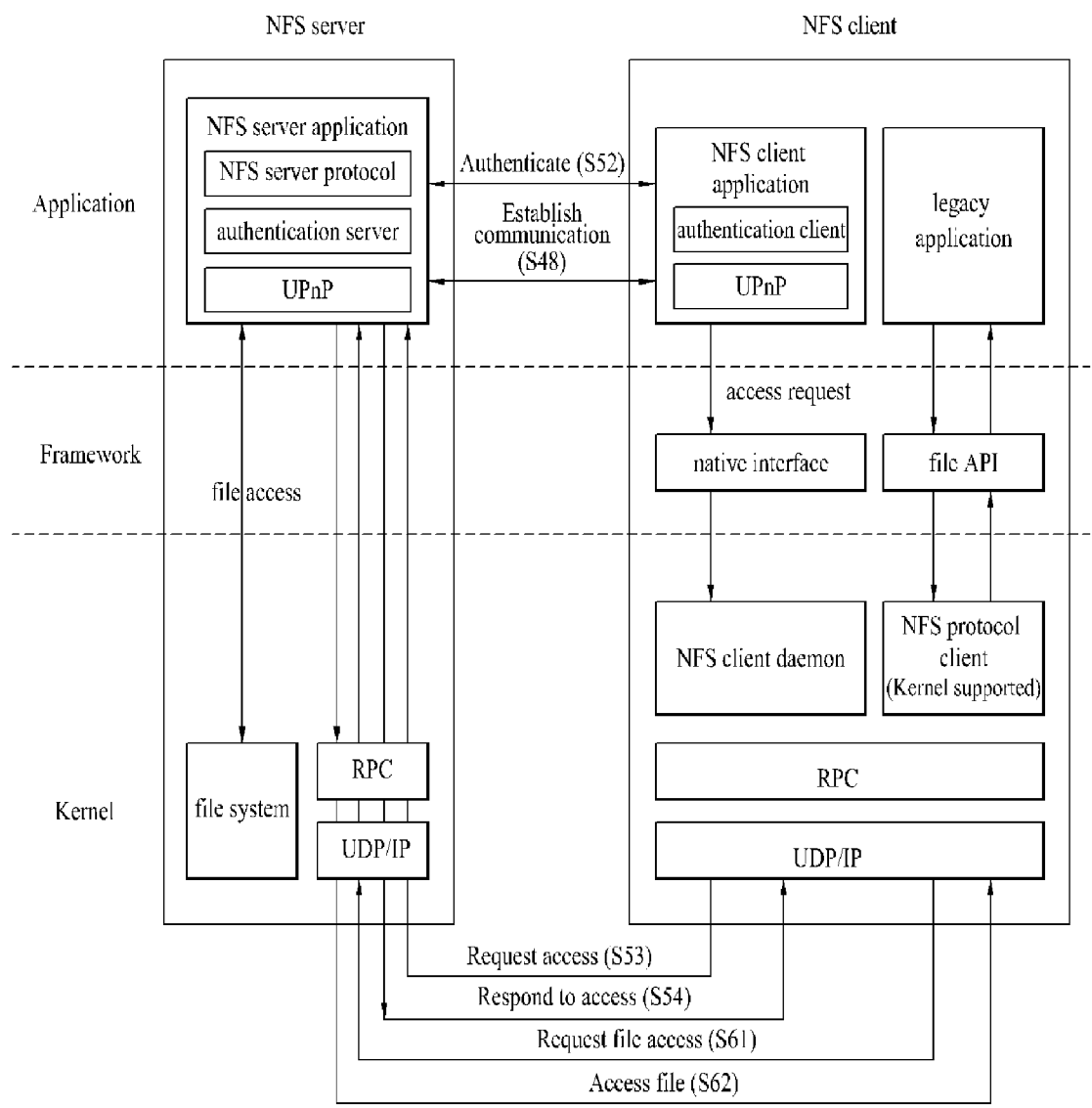
FIG. 5 is a hierarchical block diagram of client and server devices to implement the communication shown in FIG. 4.
Figure 6:
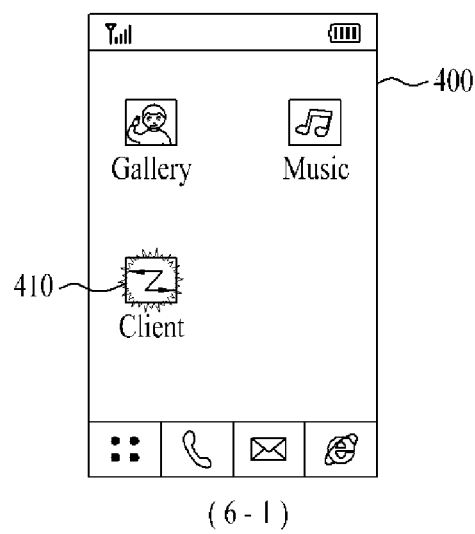
FIG. 6 and FIG. 7 are diagrams of display screens of client and server devices to implement the communication shown in FIG. 4, respectively.
Figure 6:
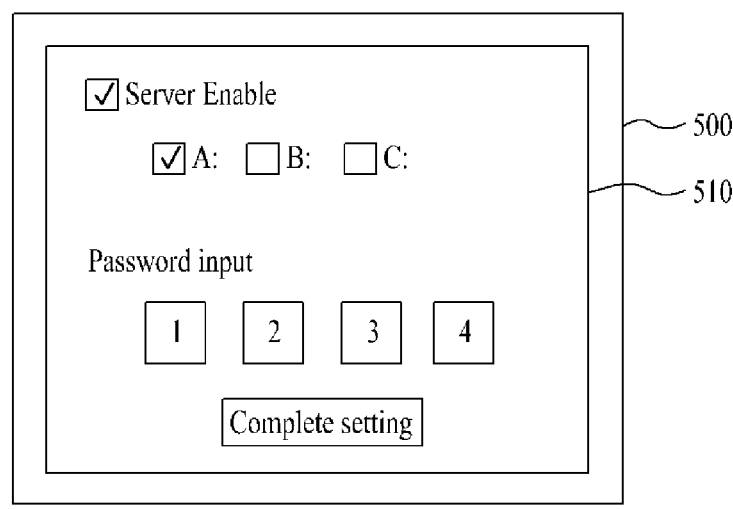
Figure 7:
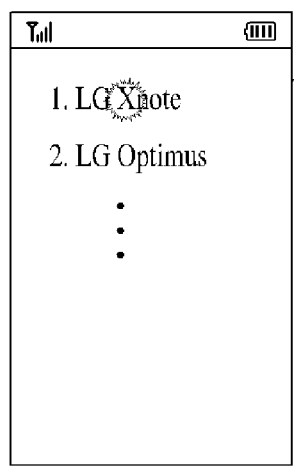
Figure 7:
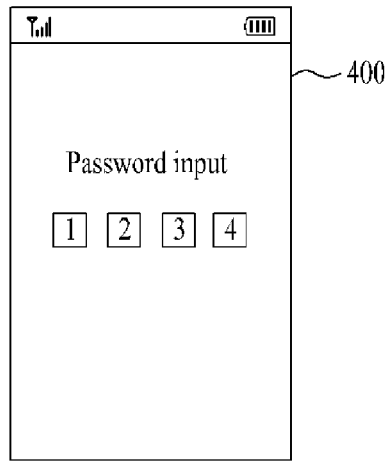
Figure 7:
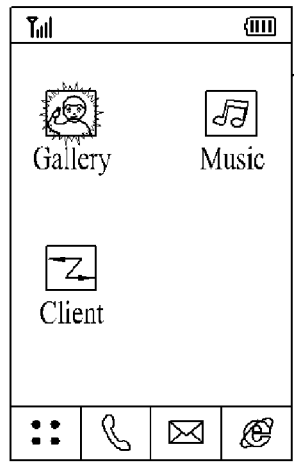
Figure 7:
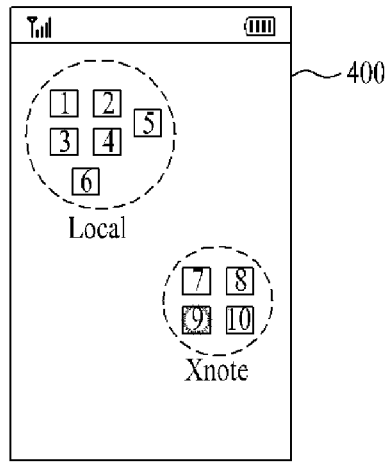
Figure 7:
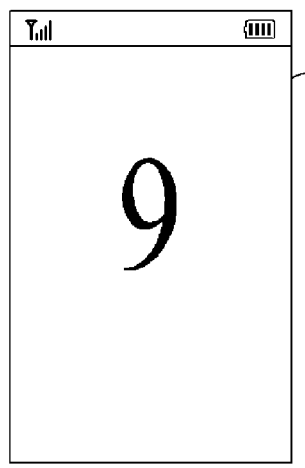

FIG. 4 is a flowchart for a communication between a client device and a server device via intranet according to an embodiment of the present invention. FIG. 5 is a hierarchical block diagram of client and server devices to implement the communication shown in FIG. 4. FIG. 6 and FIG. 7 are diagrams of display screens of client and server devices to implement the communication shown in FIG. 4, respectively.

Referring to FIGS. 4 to 7, a client function may be activated in the client device 100 [S41]. For instance, referring to FIG. 6 (6-1), a client icon 410 is prepared on a touchscreen 400 of the client device 100 to activate the client function. If the client icon 410 is selected by a touch, the client function can be activated in the client device 100. According to one embodiment of the present invention, if a user of the client device 100 desires to perform a communication with the server device 200, the user of the client device 100 may be able to activate the client function in the client device 100 using the client icon.

It may not be mandatory for the client function to be activated in the client device 100 through the client icon only.

For instance, if a current location obtained by the position-location module 115 of the client device 100 lies within a preset location range, the controller 180 may control the client function to be automatically activated in the client device 100.

For another instance, when the client device 100 accesses a preset specific wireless AP, the controller 180 may control the client function to be automatically activated in the client device 100.

On the condition that a server function corresponding to the client function is activated in the server device 200, if (or only if) the client function is activated in the client device, it may mean that a communication can be automatically established between the communication unit and the server device according to an embodiment of the present invention explained in the following description without a further user manipulation.

The activation of the server device and the establishment of the communication between the communication unit and the server device keep being described as follows.

First of all, like the activation of the client function in the client device 100, the server device 200 may be activated in various ways [S42]. For instance, referring to FIG. 6 (6-2), a popup window 510 is displayed on the touchscreen 400 of the server device 200 to activate the server function. If a user of the server device 200 touches to select an item 'server Enable' from the popup window 510, the server function can be activated.

As the server function is activated, the user of the server device 200 may be able to previously (or in advance) set at least one folder of the memory (built-in or external) of the server device 200, which allows to be scanned by the client, via the popup window 510. For example, referring to FIG. 6 (6-2), while folders of the memory of the server device 200 are displayed on the popup window 510, the user of the server device 200 can preset a desired one of the displayed folders by touching the desired folder.

Meanwhile, the user of the server device 200 may be able to previously set a password (e.g., 1234) via the popup window 510 [S43]. The preset password is provided to enable a user of the client device, who is already aware of the corresponding password, to use the server device 200 only. This shall be explained in detail later. A prescribed execution order of the steps S41 to S43 does not need to be set. For instance, at least two of the steps S41 to S43 may be simultaneously executed. For another instance, the execution order of the steps S41 to S43 may be changed anyhow. In case that the client/server function is configured to be always activated in the client/server device 100/200, it may be able to skip the step S41 and the step S42.

Once the server device 200 is activated, it may broadcast its presence within the intranet [S44]. In particular, in order to advertise its presence, the server device 200 may broadcast its server name (or server ID) (e.g., 'LG Xnote') within the intranet.

If the client device 100 having the client function activated is present within the same intranet, it may be able to receive the broadcasted server name of the server device 200 [S44].

Having received the broadcasted server name, the client device 100 broadcasts a server IP request signal for requesting a server IP address of the server device 200 corresponding to the server name within the intranet [S45]. In this case, the IP request signal may contain an identifier or identification information (e.g., a client IP address of the client device 100) of the client device 100.

Having received the broadcasted server IP request signal, the server device 200 unicasts its server IP address to the client device 100 using the identifier of the client device 100 [S46].

Having received the unicasted server IP address, referring to FIG. 7 (7-1), the client device 100 may be able to display the server name ('LG Xnote' of the server device 200 on the touchscreen 400 [S47]. If another server device (e.g., LG Optimus) is present in the intranet as well as the server device (LG Xnote) 200, the client device 100 may be able to display the server name (LG Optimus) of the latter server device on the touchscreen 400 by repeating the aforesaid steps S42 to S46.

A user of the client device 100 may touch to select one of at least one or more server devices displayed on the touchscreen 400 [S47].

By UPnP (universal plug and play) of the steps S44 to S47, the communication between the client device 100 and the server device 200 can be established [S48].

Once the communication between the client device 100 and the server device 200 is established, referring to FIG. 7 (7-2), the controller 180 of the client device 100 may control a password screen, which is provided to input a password previously set by the server device 200, to be displayed on the touchscreen 400.

The user of the client device 100 may be then able to input the preset password through the password screen [S49].

The inputted password can be forwarded to the server device 200 [S50]. If the server device 200 determines that the inputted password matches the preset password [S51], an authentication procedure between the client device 100 and the server device 200 can be completed [S52].

Alternatively, in case that any client device is granted to use the server device 200 without a separate authentication procedure, the steps S43 an the step S49 may be skipped.

Both of the password inputting step S49 and the server selecting step S47 may be performed at the same time. In this case, an inputted password transmitting step S50 may be executed together with the communication establishing step S48.

Once the authentication procedure is completed, the client device 100 may be able to make a request for an access to the preset specific folder to the server device 200 [S53].

The server device 200 then makes a response to the access request [S54].

Thus, the client device 100 may be able to complete the access to the specific folder of the server device 200 in accordance with a file sharing system scheme [S55]. In this case, the file sharing system scheme may include one of NFS (network file system) scheme, SMB (server message block) scheme and CIFS (common Internet file system) scheme.

As the access to the specific folder is completed, the client device 100 may be able to recognize the accessed specific folder as if the accessed specific folder were a part of the memory 160 of the client device 100. This may be represented as the specific folder is mounted on the client device 100.

If the access to the specific folder is completed, the controller 180 of the client device 100 may control the accessed specific folder to be automatically scanned [S56].

Thereafter, the client device 100 may be able to receive an indicator of at least one file, which is saved in the specific folder, from the server device 200 [S57]. In this case, the indicator is the information for indicating the saved file and may include at least one of a name, thumbnail image, size, extension and created date of the file. For clarity of the following description, assume that the indicator includes a thumbnail of a file. Although the client device 100 receives a thumbnail of a file saved in the specific folder from the server device 200, a real content of the saved file may not be received yet. In particular, the client device 100 receives the thumbnail of the saved file in the first place and then may later receive the real content of the saved file.

After the communication between the client device 100 and the server device 200 has been established, if (or only if) the authentication procedure is completed, the controller 180 of the client device 100 may control the thumbnail of the file saved in the specific folder to be received by scanning the specific folder of the server device 200 automatically without a further user manipulation.

Thereafter, a specific application may be activated in the client device 100 [S58]. For instance, referring to FIG. 7 (7-3), the specific application may be activated in a manner of touching to select an icon of the specific application on the touchscreen 400.

If so, since the accessed specific folder has been already scanned, despite that the user of the client device 100 does not input a separate command to scan the specific folder of the server device in the activated application, the controller 180 of the client device 100 may be able to control the thumbnail of the file in the specific folder to be automatically uploaded to the activated application in accordance with the activation of the corresponding application.

Therefore, referring to FIG. 7 (7-4), even if the user of the client device 100 does not input the separate command for scanning the specific folder of the server device 200 in the activated application, the controller 180 of the client device 100 may be able to control the thumbnail of the file in the specific folder of the server device 200 to be displayed on a screen of the activated application [S59].

For instance, assume that the activated application is a gallery application to view photo files. Referring to FIG. 7 (7-4), when the gallery application is activated in the client device 100, thumbnails of photo files saved in the memory 160 of the client device 100 are displayed on the touchscreen 400 and thumbnails of photo files saved in the specific folder of the server device 200 may be displayed on the touchscreen 400 as well. For example, referring to FIG. 7 (7-4), the thumbnails of the photo files saved in the specific folder of the server device 200 may be displayed in a manner of being visually identifiable from the thumbnails of the photo files saved in the memory 160 of the client device 100 in accordance with a display region, by which a visually identifiable display scheme may be non-limited.

Subsequently, one of the photo files saved in the specific folder may be selected in a manner of touching a thumbnail of the corresponding file among the displayed thumbnails of the photo files saved in the specific folder [S60].

If so, the client device 100 may be able to make a request for an access to the selected file to the server device 200 [S61]. In doing so, the selected file may not be directly executed in the server device 200.

Referring to FIG. 7 (7-5), the client device 100 may receive a real content of the selected file from the server device 200 and may be then able to display the received content on the touchscreen 400 [S62]. If the user of the client device 100 modifies the displayed content in part (e.g., image correction), the controller 180 of the client device 100 transmits the modified item to the server device 200 by real time and controls the modified item to be reflected by the corresponding file in the specific folder of the server device 200.

After the client device 100 has completely received the real content of the selected file, it may be able to display the received content on the touchscreen. Yet, if the selected file is a video or audio file for example, the client device 100 may be able to display the content in a manner of receiving the content as streaming media before receiving the real content of the selected file completely.

The received real content of the file is temporarily saved in the buffer of the client device 100. If a separate user command is inputted, the received real content of the file may be permanently saved in the memory 160 of the client device 100.

Alternatively, if the received real content of the file is received by the client device 100, it may be saved in the memory 160 of the client device 100 automatically and permanently without an input of a separate user command.

When a command for deleting the displayed thumbnail is inputted to the client device 100, it may control the corresponding file of the server device 200 to be deleted together with the thumbnail deleted from the touchscreen 400 [not shown in the drawing]. Alternatively, when a command for deleting the displayed thumbnail is inputted to the client device 100, it may control the corresponding file of the server device 200 not to be deleted from the server device 200 despite that the thumbnail is deleted from the touchscreen 400.

Meanwhile, while thumbnails of files of the accessed folder are being displayed on the touchscreen 400 of the client device 100, the communication between the client device 100 and the server device 200 may be disengaged. This communication disengagement may be performed in accordance with an intention of the user of the client device 100 or the server device 200 or may be inevitably performed in accordance with a communication environment between the two devices irrespective of the user's intention. In this case, the client device 100 controls the thumbnails of the files of the accessed folder to be automatically saved and may be also able to keep the thumbnails being displayed on the screen of the gallery application. In doing so, if the user selects one of the displayed thumbnails, the client device 100 automatically establishes the communication with the server device 200 and may be then able to receive a corresponding file content of the selected thumbnail from the server device 200.

When the client device 100 accesses the specific folder of the server device 200, despite that the application is not activated in the client device 100 yet, the controller 180 of the client device 100 displays a popup window for indicating the access to the specific folder on the touchscreen 400 and also controls menus, which are provided to receive files (or file contents) in the accessed specific folder entirely or in part, to be displayed on the popup window.

In the above description so far, the case of the communication between the client device and the server device via the intranet is described. In the following description, the case of the communication between the client device and the server device via the internet is explained. The following description shall be made on the assumption that the client function and the server function are activated in the client device and the server device, respectively.

Figure 8:
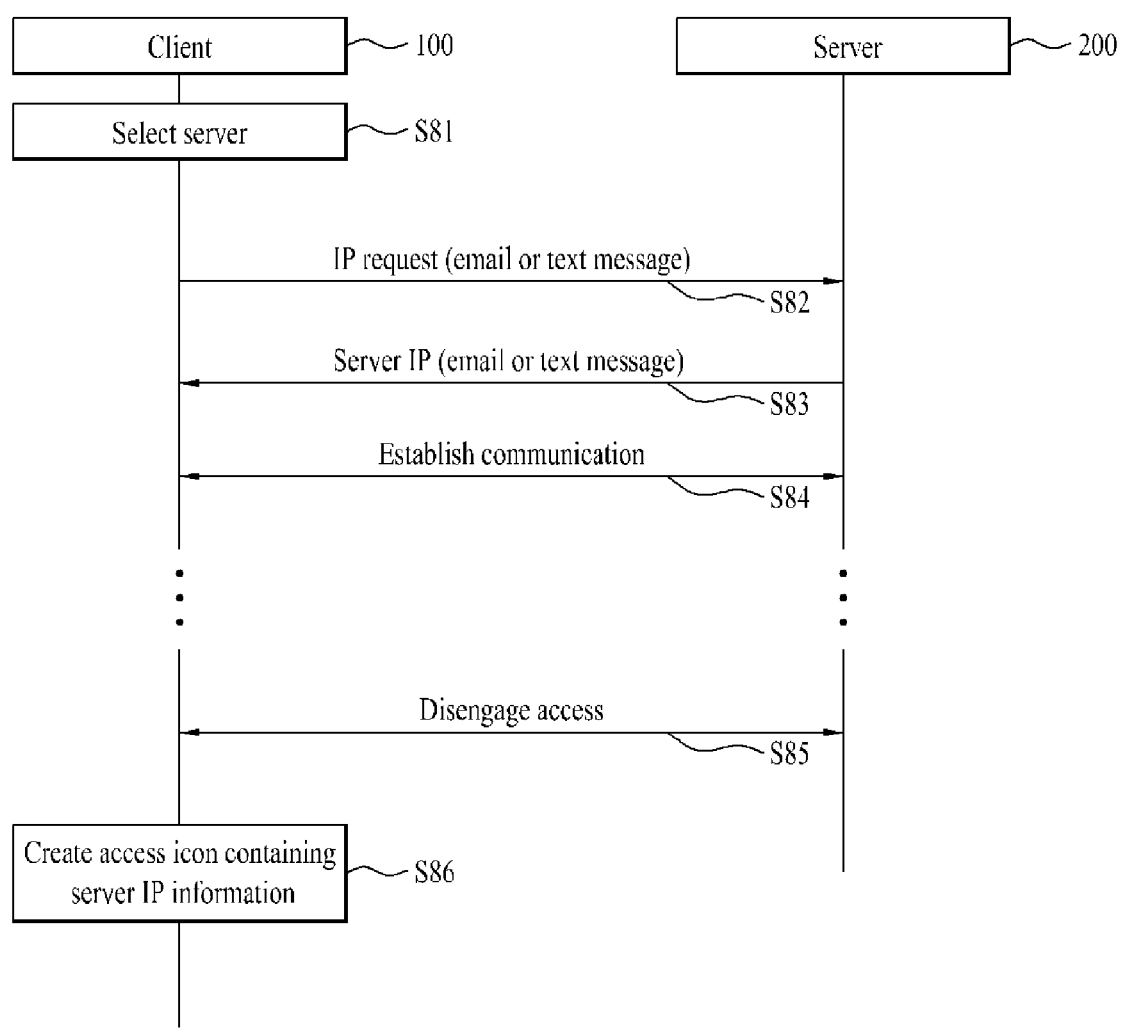
FIG. 8 is a flowchart for a communication between a client device and a server device via internet according to an embodiment of the present invention.
Figure 9:
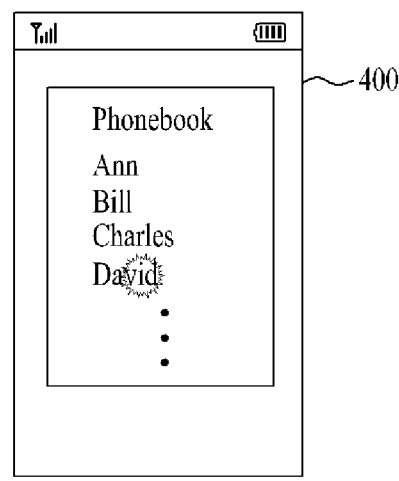
FIG. 9 is a diagram of display screen of a client device to implement the communication shown in FIG. 8.
Figure 9:
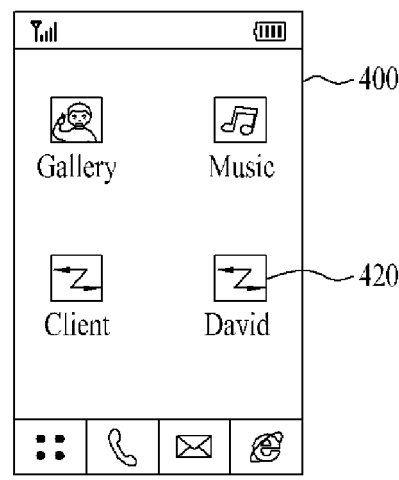

FIG. 8 is a flowchart for a communication between a client device and a server device via internet according to an embodiment of the present invention. FIG. 9 is a diagram of display screen of a client device to implement the communication shown in FIG. 8.

Referring to FIG. 9 (9-1), in order to select a desired server device, a user of the client device 100 may select a counterpart (i.e., server device) to access in a manner of touching the counterpart in a list of a phonebook displayed on the touchscreen 400 for example [S81].

If so, the controller 180 of the client device 100 may be able to send a message for requesting an IP address of a terminal (i.e., server device) of the selected counterpart to the terminal of the selected counterpart [S82]. In this case, the sent message may include an email or such a text message as SMS (short message service) and the like.

If the counterpart having received the message intends to provide its terminal as a server device for the client device 100, the counterpart may be able to transmit the IP address of its terminal as a reply (e.g., email, text message, etc.) to the message to the client device 100 [S83]. In case that the above-mentioned password is previously set for the terminal of the counterpart, the previously set password may be transmitted to the client device 100 together with the IP address.

If so, the client device 100 may be able to establish a communication with the terminal of the counterpart as the server device using the received IP address [S84]. If the client device 100 receives the previously set password, it may be able to complete an authentication procedure with the counterpart terminal using the received password. Subsequently, a specific folder of the counterpart terminal may be mounted on the client device 100. This is mentioned in the foregoing description and its details shall be omitted from the following description for clarity of this specification.

Thereafter, the access to the specific folder of the counterpart terminal by the client device 100 may be disengaged [S85]. And, the specific folder may be dismounted from the client device 100.

When the mount is cancelled, referring to FIG. 9 (9-2), the controller 180 of the client device 100 may control an access icon 420, which is provided to access the counterpart terminal as the server device, to be created on the touchscreen 400 by a user selection or automatically [S86]. The access icon 420 may store an IP address of the counterpart terminal. If necessary, the access icon may further include at least one of information on the specific server folder of the server device and the password.

In order to access the counterpart terminal later, a user of the client device 100 may touch to select the created access icon 420 only. If so, the above-mentioned steps S81 to S83 may not need to be activated. Therefore, a communication between the client device and the counterpart terminal can be quickly established.

In the above description, the case of the communication between the client device and the server device via the intranet/internet has been explained.

It may be difficult for the communication method via the intranet to be applied to the internet due to the limitation of broadcasting. Yet, since the communication method via the internet enables a message transmission within the intranet as well, it may be apparent to those skilled in the art that the via-internet communication method is applicable to the intranet.

Meanwhile, if one client device performs the above-mentioned communication procedure via the intranet or the internet on at least two server devices repeatedly, it is apparent to those skilled in the art that specific folders of the at least two server devices can be simultaneously mounted on the client device.

In the following description, after a specific folder of the server device 200 has been mounted on the client device 100, a case of adding a file to the specific folder of the server device 200 is explained.

Figure 10:
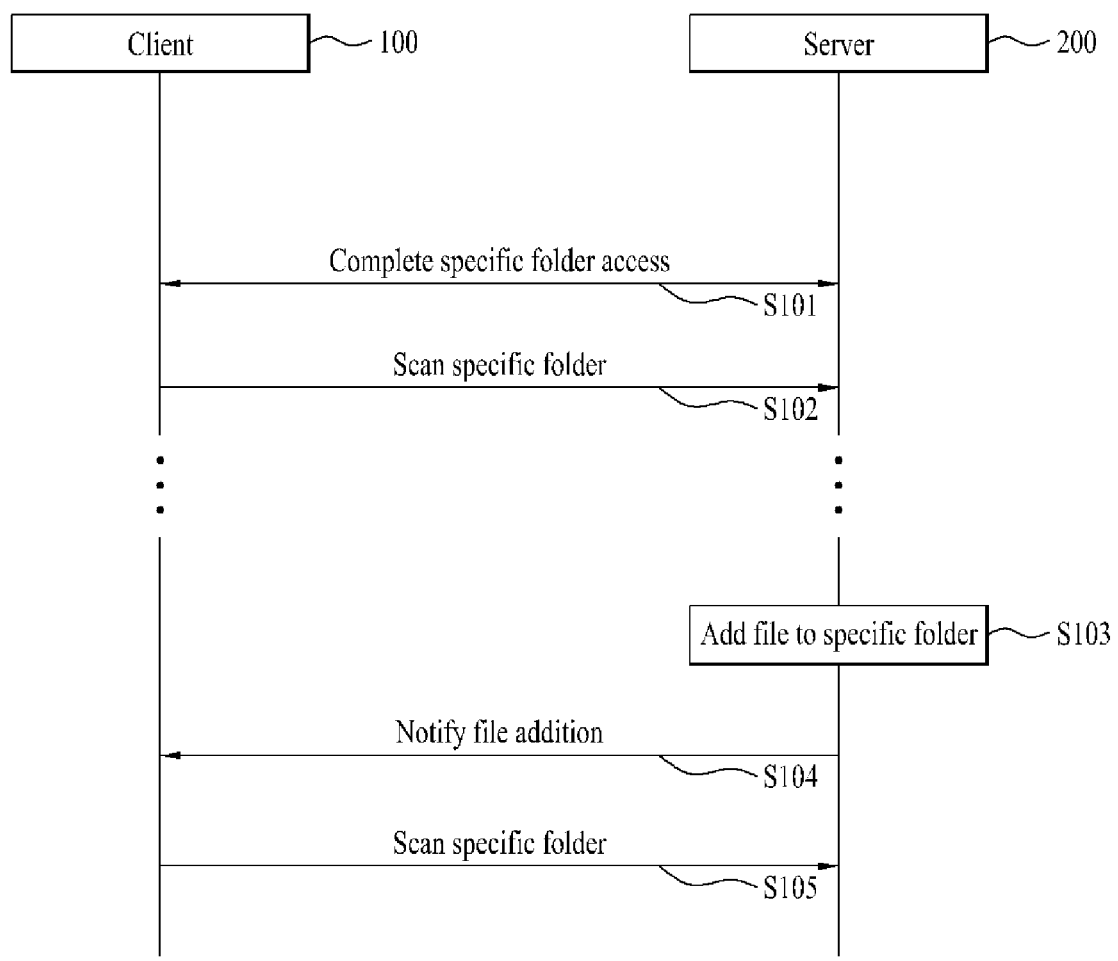
FIG. 10 is a flowchart for a communication between a client device and a server device via intra/internet according to an embodiment of the present invention.

FIG. 10 is a flowchart for a communication between a client device and a server device via intra/internet according to an embodiment of the present invention. And, FIG. 11 is a diagram of display screen of a client device to implement the communication shown in FIG. 10.

Figure 11:
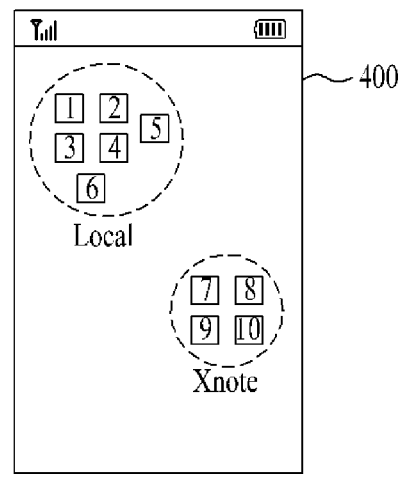
FIG. 11 is a diagram of display screen of a client device to implement the communication shown in FIG. 10.
Figure 11:
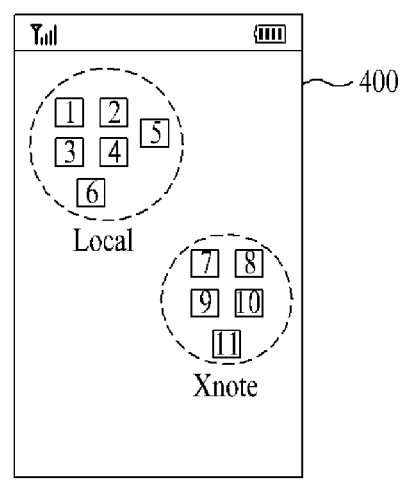

Referring to FIG. 10 and FIG. 11, the client device 100 is able to access a specific folder of the server device 200 via the intranet or the internet [S101] and may be then able to scan the accessed specific folder [S102]. Subsequently, referring to FIG. 11 (11-1), a file within the scanned specific folder may be displayed on the touchscreen 400 of the client device 100. This is explained in detail in the foregoing description and its details shall be omitted from the following description for clarity of this specification.

While the client device 100 accesses the specific folder, a file may be added to the specific folder of the server device 200 [S103].

If so, the server device 200 may be able to transmit a file addition indication signal, which indicates that the file has been added to the specific folder, to the client device 100 [S104].

The controller 180 of the client device 100 may control the specific folder of the server device 200 to be automatically scanned each time the file addition indication signal is received [S105].

Therefore, referring to FIG. 11 (11-2), the client device 100 may be able to display the file '11' added to the specific folder of the server device 200 on the touchscreen 400 by reflecting the added file '11' immediately.

According to the above description, when a file is added to the specific folder of the server device 200, the file addition indication signal is transmitted to the client device 100 from the server device 200. In response to the file addition indication signal, the client device 100 scans the specific folder of the server device 200. This may non-limit the present embodiment. For instance, after the controller 180 of the client device 100 has been initially scanned the specific folder of the serve device 200 in the step S102, it may be able to control the specific folder to be periodically scanned as a background each time interval. Hence, when the file is added to the specific folder of the server device 200, although the file addition indication signal is not transmitted to the client device 100 from the server device 200, the client device 100 may be able to reflect the file added to the specific folder.

In the following description, modification of the specific folder access processes S53 to S55 described with reference to FIG. 4 shall be explained with reference to FIG. 12.

Figure 12:
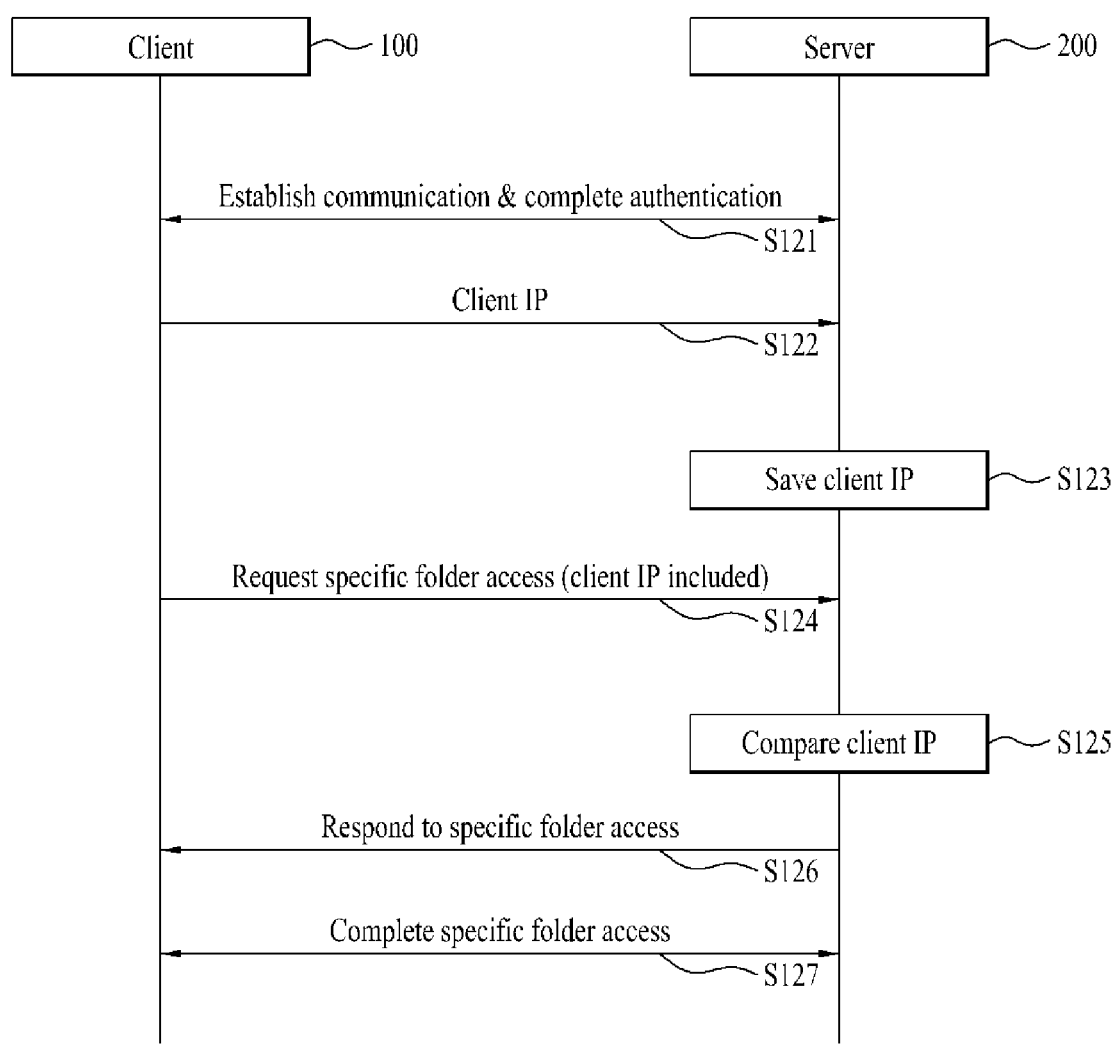
FIG. 12 is a flowchart for a communication between a client device and a server device via intra/internet according to an embodiment of the present invention.

FIG. 12 is a flowchart for a communication between a client device and a server device via intra/internet according to an embodiment of the present invention.

Referring to FIG. 12, after a communication between the client device 100 and the server device 200 has been established, an authentication procedure may be completed [S121]. This is explained in the foregoing description and its details shall be omitted from the following description for clarity of this specification.

If the authentication procedure is completed, the client device 100 may transmit its identifier or identification information (e.g., IP address) to the server device 200 [S122].

The server device 200 then saves the transmitted identifier of the client device 100 [S123].

The client device 100 may be able to transmit an access request signal for a access to the previously set specific folder to the server device 200 [S124]. In this case, the identifier of the client device 100 may be contained in the access request signal.

After the access request signal has been received by the server device 200, the controller 280 of the server device 200 may compare the identifier contained in the access request signal with the previously saved identifier [S125].

As a result of the comparison, only if both of the identifiers are identical to each other, the server device 200 may make a response to grant the access request signal [S126].

Thus, the client device 100 may be able to complete the access to the specific folder of the server device 200 [S127].

According to the modified specific folder access process, only the client device 100 having contributed to the establishment of the communication with the server device and the authentication procedure may be allowed to access the specific folder of the server device 200.

Figure 13:
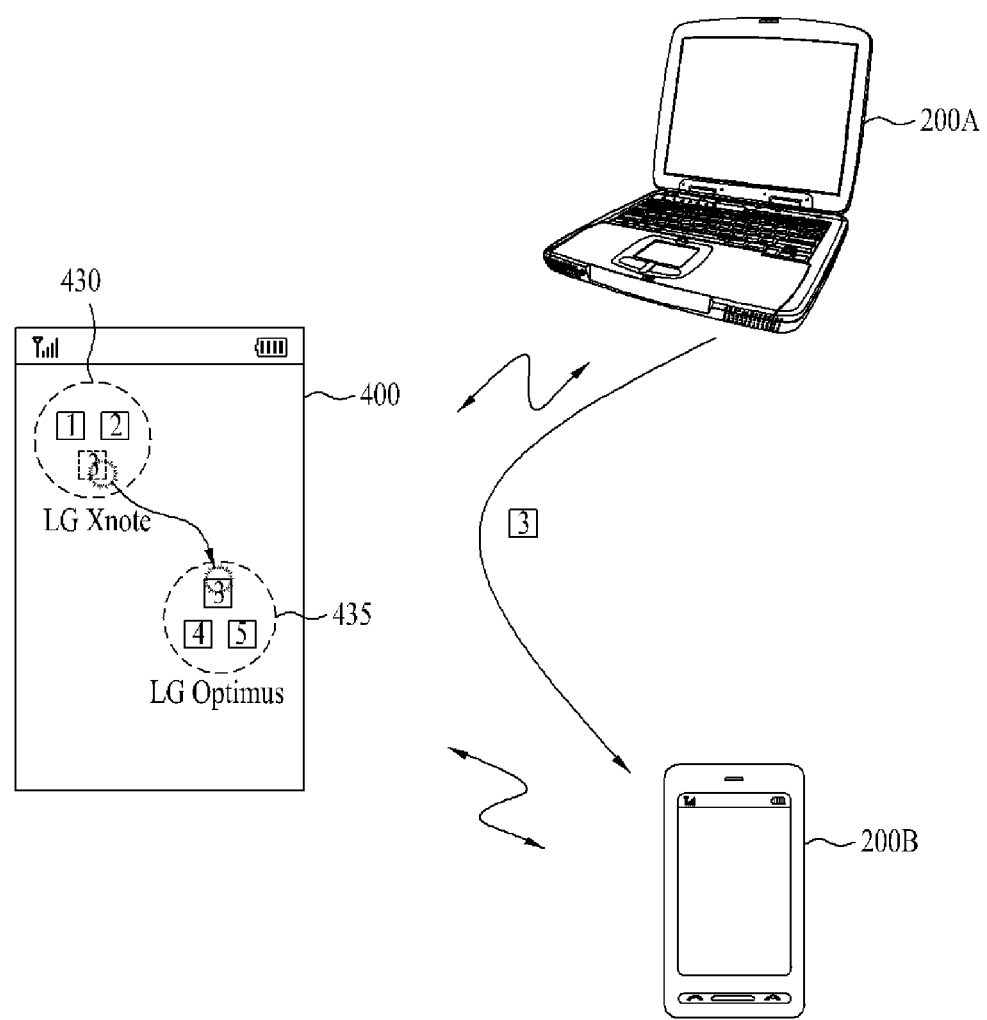
FIG. 13 and FIG. 14 are diagrams of display screen of a client device in the course of communicating with at least two server devices simultaneously, respectively.
Figure 14:
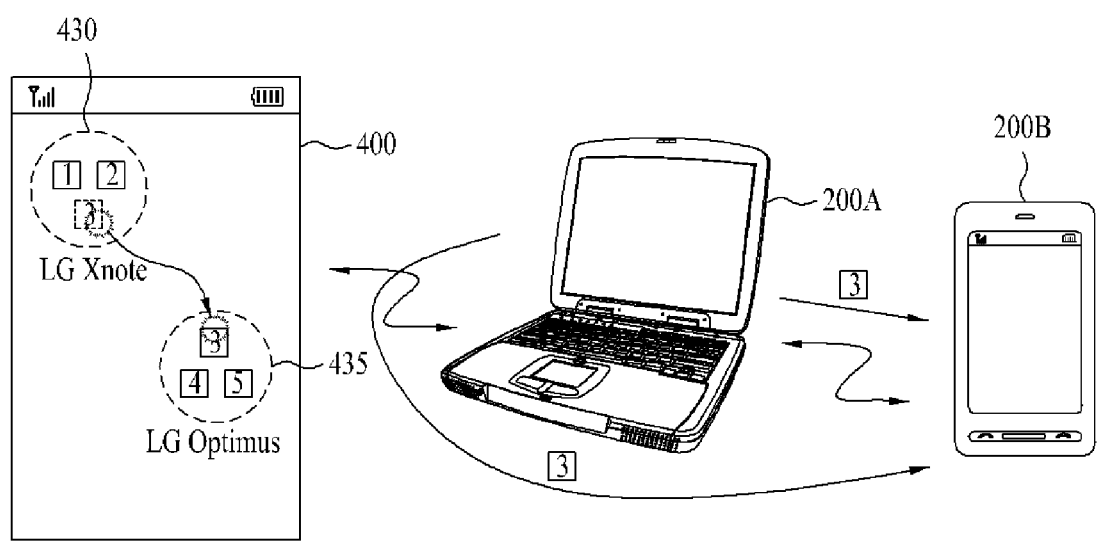

In the following description, explained with reference to FIG. 13 and FIG. 14 is a case that the client device 100 accesses at least two server devices 200A and 200B.

FIG. 13 and FIG. 14 are diagrams of display screen of a client device in the course of communicating with at least two server devices simultaneously, respectively.

Referring to FIG. 13, the client device 100 repeatedly performs the above-mentioned communication and access procedures on each of a $1^{st}$ server device 200A and a $2^{nd}$ server device 200B, whereby a $1^{st}$ specific folder of the $1^{st}$ server device 200A and a $2^{nd}$ specific folder of the $2^{nd}$ server device 200B can be simultaneously mounted on the client device 100.

A mount history (e.g., server names and mounted time information) of the mounted at least two server devices may be saved in the client device 100. The saved mount history may be displayed in a manner of being enumerated in order of time together with a call history or a message history in the client device 100. Alternatively, the saved mount history may be individually displayed in order of time separately from the call history and the message history.

Files of the $1^{st}$ specific folder of the $1^{st}$ server device (LG Xnote) 200A are displayed on a $1^{st}$ region 430 of the touchscreen 400 of the client device 100 and files of the $2^{nd}$ specific folder of the $2^{nd}$ server device (LG Optimus) 200B are displayed on a $2^{nd}$ region 435 on the touchscreen 400 of the client device 100, simultaneously.

For instance, when a file is touched & dragged to the $2^{nd}$ region 435 from the $1^{st}$ region 430 of the touchscreen 400, the controller 180 of the client device 100 may control the selected file to be copied or shifted to the $2^{nd}$ specific folder of the $2^{nd}$ server device 200B via the client device 100 (e.g., $1^{st}$ specific folder→client device→$2^{nd}$ specific folder).

Before a file is touched & dragged to the $2^{nd}$ region 435 from the $1^{st}$ region 430 on the touchscreen 400, a content of the selected file may be already transferred to the client device 100. In this case, if a file is touched & dragged to the $2^{nd}$ region 435 from the $1^{st}$ region 430 on the touchscreen 400, the controller 180 of the client device 100 provides the transferred content of the selected file to the $2^{nd}$ specific folder of the $2^{nd}$ server device 200B from the client device 100, thereby controlling the copy or shift to proceed more quickly.

Referring to FIG. 14, the client device 100 performs the above-mentioned communication and access procedures on each of the $1^{st}$ server device 200A, on which the $2^{nd}$ specific folder of the $2^{nd}$ server device 200B is already mounted, whereby the $1^{st}$ specific folder of the $1^{st}$ server device 200A and the $2^{nd}$ specific folder of the $2^{nd}$ server device 200B can be simultaneously mounted on the client device 100.

As mentioned in the foregoing description, files of the $1^{st}$ specific folder of the $1^{st}$ server device (LG Xnote) 200A are displayed on a $1^{st}$ region 430 of the touchscreen 400 of the client device 100 and files of the $2^{nd}$ specific folder of the $2^{nd}$ server device (LG Optimus) 200B are displayed on a $2^{nd}$ region 435 of the touchscreen 400 of the client device 100, simultaneously.

For instance, when a file is touched & dragged to the $2^{nd}$ region 435 from the $1^{st}$ region 430 on the touchscreen 400, the controller 180 of the client device 100 may control the selected file to be directly copied or shifted to the $2^{nd}$ specific folder of the $2^{nd}$ server device 200B without passing through the client device 100 (e.g., $1^{st}$ specific folder→$2^{nd}$ specific folder).

For another instance, when a file is touched & dragged to the $2^{nd}$ region 435 from the $1^{st}$ region 430 on the touchscreen 400, the controller 180 of the client device 100 may control the selected file to be copied or shifted to the $2^{nd}$ specific folder of the $2^{nd}$ server device 200B via the client device 100 and the $1^{st}$ server device 200A in turn (e.g., $1^{st}$ specific folder→client device→$1^{st}$ server device→$2^{nd}$ specific folder).

It will be apparent to those skilled in the art that various modifications and variations can be specified into other forms without departing from the spirit or scope of the inventions.

As mentioned in the foregoing description, referring to FIG. 7 (7-4), thumbnails of photo files saved in the specific folder of the server device may be displayed in a manner of being visually identifiable from thumbnails of photo files saved in the memory 160 of the client device 100 in accordance with a display region for example, by which the present invention may be non-limited.

Figure 15:
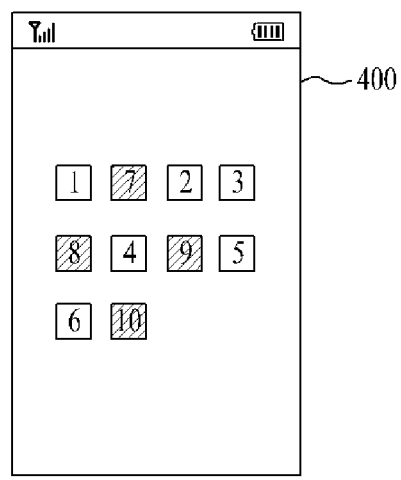
FIG. 15 is a diagram of display screen of a client device to implement the communication shown in FIG. 4.
Figure 15:
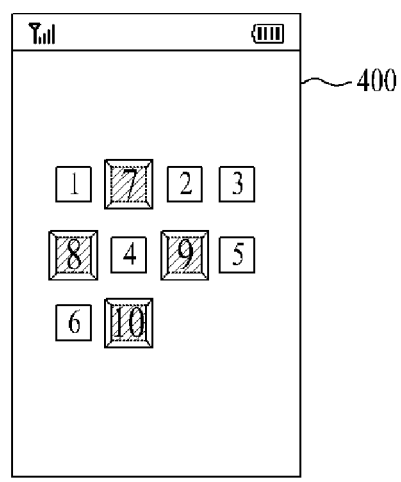

Referring to FIG. 15 (15-1) and FIG. 15 (15-2), thumbnails of photo files saved in the specific folder of the server device may be listed in a manner of being mixed with thumbnails of photo files saved in the memory 160 of the client device 100 in accordance with a file created date and hour for example.

Referring to FIG. 15 (15-1), thumbnails of photo files saved in the specific folder of the server device and thumbnails of photo files saved in the memory 160 of the client device 100 may be displayed in a manner of being visually identifiable from each other in colors for example.

Referring to FIG. 15 (15-2), thumbnails of photo files saved in the specific folder of the server device and thumbnails of photo files saved in the memory 160 of the client device 100 may be displayed by being visually identifiable from each other in a manner of being displayed on different layers in 3D space of the touchscreen 400 for example.

Accordingly, the present invention provides the following effects and/or advantages.

First of all, according to at least one of embodiments of the present invention, a specific folder (or all folders) storing files of the server terminal can be recognized as a folder in the corresponding client terminal to facilitate the files of the server terminal to be used by a user of the client terminal more conveniently.

Secondly, according to at least one of embodiments of the present invention, privacy of a user of the server terminal can be respected in a manner of allowing files to be shared with a specific client terminal granted by the server terminal only.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A client device comprising:
a display unit;
a transceiver configured to communicate with a server device having a server memory including a plurality of first photo files;
a memory configured to store a plurality of second photo files; and
a processor configured to:
establish a communication with the server device,
execute a photo viewer application in the client device, and
automatically load a plurality of first indicators of the plurality of first photo files to the executed photo viewer application, such that in response to execution of the photo viewer application, the plurality of first indicators of the plurality of first photo files are automatically displayed together with a plurality of second indicators of the plurality of second photo files on a screen of the executed photo viewer application in the client device,
wherein the plurality of first indicators of the plurality of first photo files are visually identifiable from the plurality of second indicators of the plurality of second photo files on the screen of the executed photo viewer application in the client device, wherein in response to an addition of another photo file into the server memory of the server device during establishment of the communication, the processor is further configured to automatically display another indicator corresponding to the added photo file together with the plurality of first indicators on the screen of the executed photo viewer application in the client device, and
wherein the processor is further configured to:
in response to selection of one of the first indicators, display a specific photo file corresponding to the selected indicator, and
in response to image-correction of the displayed photo file, transmit information about the image-correction to the server device in real time such that the image-correction is reflected to the specific photo file stored in the server device.

2. The client device of claim 1, wherein the transceiver communicates with the server device by UDP/IP or TCP/IP.

3. The client device of claim 1, wherein if the transceiver establishes the communication, the processor transmits a prescribed identifier to the server device and controls the server device to store the identifier.

4. The client device of claim 3, wherein when the communication is established, the processor controls the transceiver to transmit an access request signal for an access to the server memory to the server device in a manner that the access request signal contains an identifier identical to the transmitted prescribed identifier, and
wherein if the stored identifier is equal to the identifier contained in the access request signal, the processor receives a grant signal for the access request signal from the server device and controls the transceiver to access the server memory according to a file sharing system scheme.

5. The client device of claim 3, wherein the prescribed identifier comprises an IP (internet protocol) address of the client device.

6. The client device of claim 1, wherein the processor is further configured to obtain a current location of the client device, and
wherein if the current location of the client device lies within a preset location range, the processor is configured to automatically establish the communication between the transceiver and the server device.

7. The client device of claim 1, wherein when the transceiver accesses a previously set specific wireless AP, the processor is configured to automatically establish the communication between the transceiver and the server device via the accessed wireless AP.

8. The client device of claim 1, wherein the processor is configured to display the plurality of indicators on a corresponding screen region of the executed photo viewer application displayed on the display unit.

9. The client device of claim 1, wherein the processor is further configured to:
automatically scan the server memory of the server device in response to establishment of the communication with the server device,
receive a plurality of thumbnails of the plurality of first photo files in the server memory from the server device, and
in response to execution of the photo viewer application in the client device, automatically load the received plurality of thumbnails to the photo viewer application as the plurality of first indicators.

10. The client device of claim 1, wherein when one of the plurality of indicators is selected, the processor is configured to receive a corresponding photo file of the selected indicator from the server device, and display the received photo file in the photo viewer application.

11. The client device of claim 1, wherein when a command for deleting a specific one of the displayed plurality of indicators is inputted, the processor is configured to delete a corresponding photo file of the server device together with the specific indicator, or not delete the corresponding photo file of the server device despite deleting the specific indicator.

12. The client device of claim 1, wherein the processor is further configured to:
   display an access icon including an IP (internet protocol) address information of the server device on the display unit, and
   control the transceiver to establish the communication with the server device when the access icon is selected.

13. The client device of claim 12, wherein the access icon further includes at least one of an information on the server memory of the server device and a communication password information for establishing the communication with the server device.

14. The client device of claim 12, wherein, the processor is configured to create the access icon automatically or by a user selection, when the communication with the server device is disengaged.

15. The client device of claim 1, wherein when the another file is added to the server memory, the processor is configured to receive a file addition indication signal from the server device and automatically scan the server memory again in response to the received file addition indication signal.

16. The client device of claim 1, wherein the processor is configured to automatically scan the server memory periodically after the communication with the server device is established.

17. The client device of claim 1, wherein the processor is further configured to access the server memory according to a file sharing system scheme, and
   wherein the file sharing system scheme comprises at least one selected from the group consisting of NFS (network file system) scheme, SMB (server message block) scheme and CIFS (common internet file system) scheme.

18. The client device of claim 1, further comprising a mobile terminal.

19. The client device of claim 1, wherein the processor is further configured to:
   continue to display the plurality of the first indicators regardless of disconnection of the communication between the client device and the server device.

20. A method of controlling a client device, the method comprising:
   establishing a communication with a server device having a server memory including a plurality of first photo files;
   executing a photo viewer application in the client device; and
   automatically loading a plurality of first indicators of the plurality of first photo files to the executed photo viewer application, such that in response to execution of the photo viewer application, the plurality of first indicators are automatically displayed together with a plurality of second indicators of a plurality of second photo files stored on a memory of the client device, on a screen of the executed photo viewer application in the client device,
   wherein the plurality of first indicators of the plurality of first photo files are visually identifiable from the plurality of second indicators of the plurality of second photo files on the screen of the executed photo viewer application in the client device,
   wherein in response to an addition of another photo file into the server memory of the server device during establishment of the communication, another indicator corresponding to the added photo file is automatically displayed together with the plurality of first indicators on the screen of the executed photo viewer application in the client device, and
   wherein the method further comprises:
   in response to selection of one of the first indicators, displaying a specific photo file corresponding to the selected indicator; and
   in response to image-correction of the displayed photo file, transmitting information about the image-correction to the server device in real time such that the image-correction is reflected to the specific photo file stored in the server device.

21. A non-transitory electronic recording medium encoded to enable a client device to execute:
   a command for establishing a communication with a server device having a server memory including a plurality of first photo files;
   a command for executing a photo viewer application in the client device; and
   a command for automatically loading a plurality of first indicators of the plurality of first photo files to the executed photo viewer application, such that in response to execution of the photo viewer application, the plurality of first indicators are automatically displayed together with a plurality of second indicators of a plurality of second photo files stored on a memory of the client device, on a screen of the executed photo viewer application in the client device,
   wherein the plurality of first indicators of the plurality of first photo files are visually identifiable from the plurality of second indicators of the plurality of second photo files on the screen of the executed photo viewer application in the client device,
   wherein in response to addition of another photo file into the server memory of the server device during establishment of the communication, another indicator corresponding to the added photo file is automatically displayed together with the plurality of first indicators on the screen of the executed photo viewer application in the client device, and
   wherein the non-transitory electronic recording medium further enables the client device to execute:
   in response to selection of one of the first indicators, a command for displaying a specific photo file corresponding to the selected indicator, and
   in response to image-correction of the displayed photo file, a command for transmitting information about the image-correction to the server device in real time such that the image-correction is reflected to the specific photo file stored in the server device.

\* \* \* \* \*